United States Patent [19]
Lum et al.

[11] Patent Number: 5,287,525
[45] Date of Patent: Feb. 15, 1994

[54] SOFTWARE CONTROLLED POWER SHUTDOWN IN AN INTEGRATED CIRCUIT

[75] Inventors: Sammy S. Lum, Alameda; William C. Rempfer, Santa Clara, both of Calif.

[73] Assignee: Linear Technology Corporation, Palo Alto, Calif.

[21] Appl. No.: 10,477

[22] Filed: Jan. 28, 1993

Related U.S. Application Data

[63] Continuation of Ser. No. 780,524, Oct. 17, 1991, abandoned, which is a continuation of Ser. No. 442,846, Nov. 29, 1989, abandoned.

[51] Int. Cl.$^5$ .......................... G06F 1/00; G06F 1/32
[52] U.S. Cl. ........................ 395/750; 364/707; 364/273.1; 364/273.2; 364/273.5; 364/DIG. 1; 364/273.1; 364/273.2; 364/273.5; 364/DIG. 1
[58] Field of Search ............... 395/750, 575; 364/707; 365/226, 227; 371/66

[56] References Cited

U.S. PATENT DOCUMENTS

| | | | |
|---|---|---|---|
| 4,164,786 | 8/1979 | Gollomp | 364/200 |
| 4,573,117 | 2/1986 | Boney | 364/200 |
| 4,590,553 | 5/1986 | Noda | 364/200 |
| 4,669,059 | 5/1987 | Little et al. | 364/900 |
| 4,698,748 | 10/1987 | Juzswik et al. | 364/200 |
| 4,716,521 | 12/1987 | Nagae | 364/200 |
| 4,723,269 | 2/1988 | Summerlin | 379/102 |
| 4,780,843 | 10/1988 | Tietjen | 364/900 |
| 4,794,525 | 12/1988 | Pickert et al. | 364/200 |
| 4,807,141 | 2/1989 | Muller | 364/464.02 |
| 4,868,832 | 9/1989 | Marrington et al. | 364/200 |
| 4,962,487 | 10/1990 | Suzuki | 365/233.5 |
| 4,967,400 | 10/1990 | Woods | 367/21 |
| 4,980,836 | 12/1990 | Carter et al. | 364/483 |

Primary Examiner—Gopal C. Ray
Attorney, Agent, or Firm—Flehr, Hohbach, Test, Albritton & Herbert

[57] ABSTRACT

Power shutdown of an integrated circuit such as a data acquisition system is implemented by software command. In one embodiment of a data acquisition system, an 8 bit data input word for configuring the operation of the data acquisition system includes two word length bits which define the length of data output words. One combination of the word length bits is utilized to command power shutdown. A decoder within the integrated circuit identifies the power shutdown command and generates a power shutdown signal (PS) to minimize power consumption when the circuit is not in operation.

4 Claims, 2 Drawing Sheets

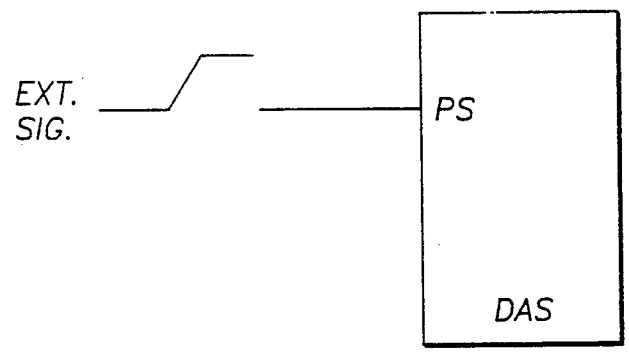
(PRIOR ART)
FIG.—1
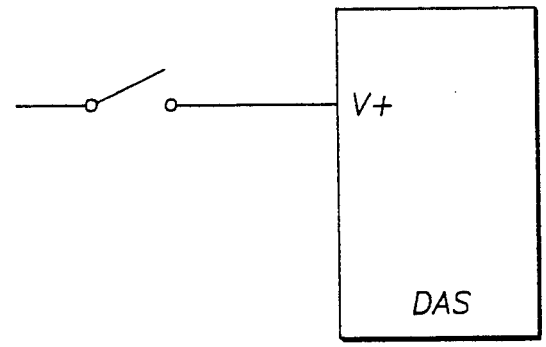
(PRIOR ART)
FIG.—2
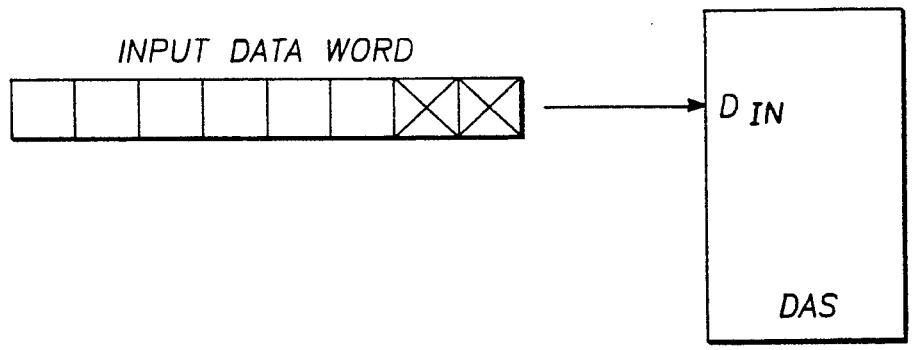
FIG.—3

SOFTWARE CONTROLLED POWER SHUTDOWN IN AN INTEGRATED CIRCUIT

This application is a continuation of 07/780,524, filed Oct. 17, 1991, now abandoned which is a continuation of 07/442,846, filed Nov. 29, 1989, now abandoned.

BACKGROUND OF THE INVENTION

This invention relates generally to the control of power in an electronic integrated circuit such as a data acquisition system (DAS), and more particularly the invention is directed to control of power without the need for a dedicated circuit pin.

A data acquisition system such as the Linear Technology Corporation LTC1290 single chip data acquisition system contains a serial I/O successive approximation A/D converter. The device uses switch capacitor technology to perform either 12 bit unipolar or 11 bit plus sign bipolar A/D conversions. An 8 channel input multiplexer can be configured for either single ended or differential inputs, or combinations thereof. An on-chip sample and hold is included for all single ended input channels. When the circuit is idle, it can be powered down in applications where low power consumption is desired.

The circuit is packaged in a 20 lead ceramic DIP. Heretofore, control of power shutdown in such electronic circuits have required a dedicated package pin. Alternatively, external control has been used by actually disconnecting the power source from the circuit.

The present invention is directed to controlling and implementing a power shutdown from within the circuit but without the need for a dedicated pin.

SUMMARY OF THE INVENTION

An object of the invention is control of power shutdown within an integrated circuit without the use of dedicated package pins.

A feature of the invention is the use of software to control power down in an integrated circuit.

Briefly, selected bits in an input data word are utilized to control power shutdown. In a data acquisition system such as the LTC1290, an input data word is used to configure the circuit as to MUX address, mode of operation, and word length. The two bits used for word length establish the output word length as 8 bits, 12 bits, or 16 bits. In accordance with the invention the 2 bits also control power shutdown with a decoder in the circuit responding to the 2 bit code generating a power shutdown (PS) signal which inhibits the comparator circuitry of the DAS.

The invention and objects and features thereof will be more readily apparent from the following detailed description and appended claims when taken with the drawings.

BRIEF DESCRIPTION OF THE DRAWINGS

FIG. 1 and FIG. 2 are functional diagrams of power shutdown control in accordance with prior art.

FIG. 3 is a functional diagram of power shutdown control in accordance with the present invention.

DESCRIPTION OF THE PREFERRED EMBODIMENT

Figure 4:
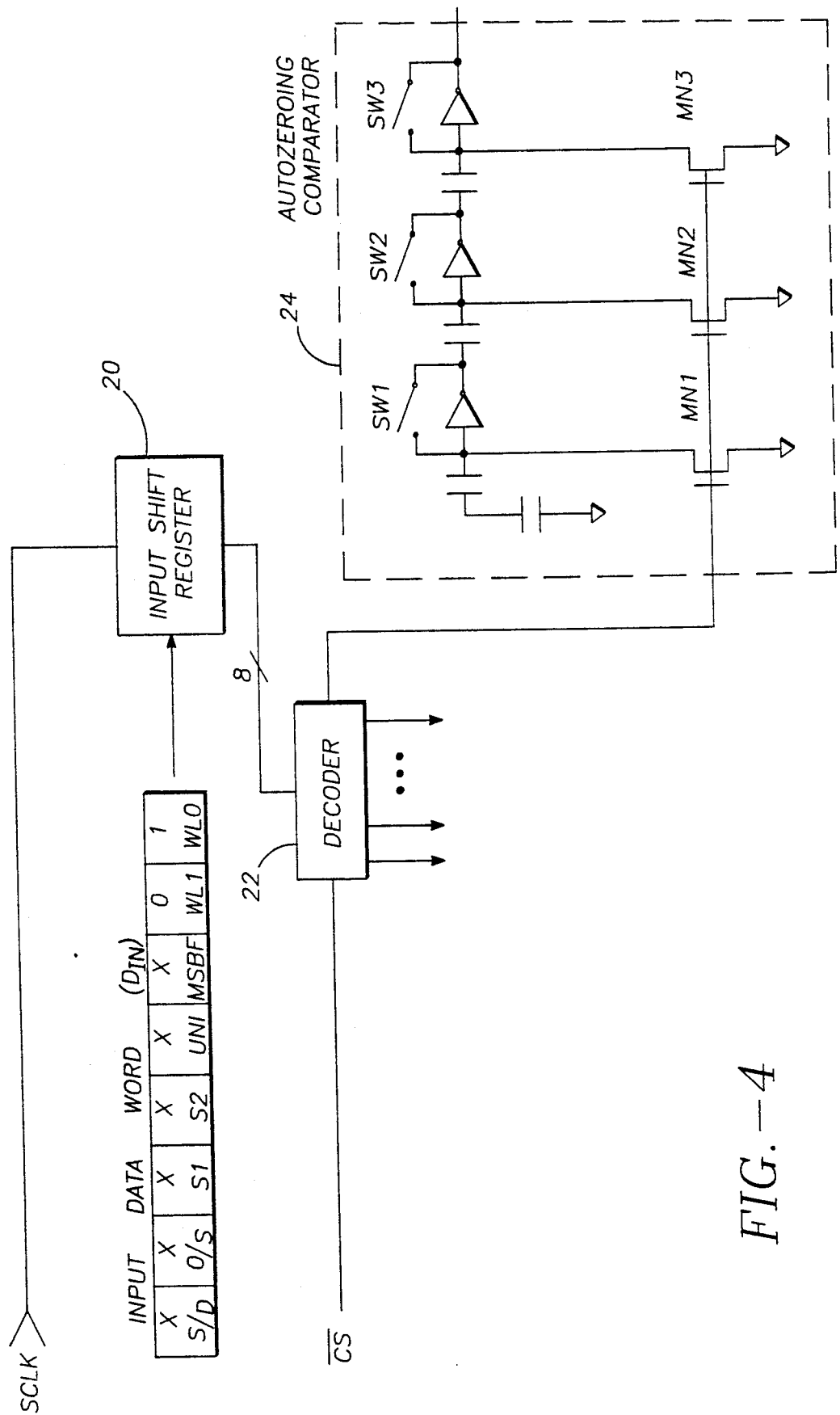
FIG. 4 is a more detailed functional diagram of the power shutdown of FIG. 3.

FIG. 1 and FIG. 2 are functional diagrams illustrating power shutdown control of packaged integrated devices such as data acquisition systems in accordance with the prior art. In FIG. 1 the packaged DAS is provided with a pin labeled PS which receives an external signal for controlling power shutdown. As noted above, the use of a dedicated pin in a packaged circuit is undesirable due to the limited number of pins available for power, control, and data inputs. In FIG. 2, the control of power shutdown is effected by selectively connecting and disconnecting an external power supply to the power input terminal V+. However, this generally requires additional external hardware and circuitry.

FIG. 3 is a functional diagram of software controlled power shutdown in accordance with the present invention. In an integrated circuit such as the LTC1290 data acquisition system, an input data word is clocked into the DAS to configure the circuit for operation (e.g. channel selection, unipolar versus bipolar, and word length). A dedicated bit combination is used to place the DAS in power shutdown where the circuit can run at a greatly reduced power supply thus minimizing power drain on batteries. Importantly, a separate dedicated pin is not required, and external hardware is obviated.

FIG. 4 is a more detailed functional diagram of the circuitry of FIG. 3 for the LTC1290 DAS. The 8 bit data word is clocked into the DIN input after a chip select signal is recognized by the circuitry. The first four bits of the input word assign the MUX configuration for the requested conversion. The first bit, SGL/DIFF, determines a differential mode or a single ended mode, and the odd/sign (O/S) bit along with the select one (S1) and select two (S2) bits complete the MUX address. The unipolar/bipolar (UNI) bit determines whether a conversion will be unipolar or bipolar, and the MSBF bit establishes MSB first or LSB first sequence of output data. The WL1 and WL0 word length bits determine the output word length and also are utilized for power shutdown in accordance with the following table:

| WL1 | WL0 | Output Word Length |
|---|---|---|
| 0 | 0 | 8 bits |
| 0 | 1 | Power shutdown |
| 1 | 0 | 12 bits |
| 1 | 1 | 16 bits |

The input data word is clocked into the input shift register 20 and then applied to a decoder 22. The input word is decoded and a power shutdown (PS) signal is generated as shown in the above table. The PS signal is applied to N channel transistors MN1, MN2, and MN3 in an auto zeroing comparator shown generally at 24. The PS signal goes high and switches S1–S3 are opened thereby forcing all of the outputs of the inverters high. When the switches S1–S3 are closed, the supply current is maximum. With the inverter outputs forced high there is no current drain. Accordingly, during normal operation the PS signal remains low and is reset by the chip select bar ($\overline{CS}$) after power shutdown has been select requested.

The use of a software word to control power shutdown in an integrated circuit such as a data acquisition system eliminates the need of a dedicated pin and obviates the need of external hardware. While the present invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. A method for providing an internal power shutdown signal in an integrated circuit in response to a multi-bit circuit configuration word received by said integrated circuit, said integrated circuit being enabled to receive said configuration word upon receipt of a chip select signal, wherein said circuit configuration work includes at least one configuration bit used by said integrated circuit to configure said integrated circuit for operation, said method comprising the steps of:

(a) serially clocking said circuit configuration word into said integrated circuit, said circuit configuration word including at least one word length bit for defining lengths of output words produced by said integrated circuit;

(b) decoding said at least one configuration bit of said circuit configuration word into a first data value and configuring said integrated circuit into an operative mode in accordance with said first data value and said chip select signal;

(c) decoding said at least one word length bit of said configuration word into a second data value and comparing said second data value with a predefined value representative of a power shutdown command;

(d) generating a power shutdown signal on the basis of said comparison of said second data value with said predefined power shutdown command, said power shutdown signal being reset by the chip select signal received by said integrated circuit; and (e) shutting down power in response to generation of said power shutdown signal.

2. The method as defined by claim 1 wherein said integrated circuit is a data acquisition system, said circuit configuration word is an 8 bit input data word.

3. An apparatus for providing an internal signal for power shutdown in an integrated circuit which receives a multi-bit circuit configuration word, said integrated circuit being enabled to receive said configuration word upon receipt of a chip select signal, wherein said circuit configuration word includes at least one configuration bit used by said integrated circuit to configure said integrated circuit for operation, comprising:

means for clocking said circuit configuration word into said integrated circuit, said circuit configuration word including at least one word length bit for defining lengths of output words produced by said integrated circuit;

means for decoding said at least one configuration bit and said at least one word length bit of said circuit configuration word into first and second data values, respectively, and for comparing said second data value with a predefined value representative of a power shutdown command;

means for configuring said integrated circuit into an operative mode in accordance with said first data value and said chip select signal; and means for generating a power shutdown signal for said integrated circuit on the basis of said comparison of said second data value with said predefined value representative of a power shutdown command wherein said power shutdown signal is reset by the chip select signal received by said decoding means.

4. Apparatus as defined by claim 3 wherein said integrated circuit is a data acquisition system.

* * * * *

UNITED STATES PATENT AND TRADEMARK OFFICE
CERTIFICATE OF CORRECTION

PATENT NO. : 5,287,525 Page 1 of 1
DATED : February 15, 1994
INVENTOR(S) : Lum et al.

It is certified that error appears in the above-identified patent and that said Letters Patent is hereby corrected as shown below:

<u>Title page,</u>
Item [73], Assignee, please change "Linear Technology Corporation, Palo Alto, Calif." to -- Linear Technology Corporation, Milpitas, Calif. --

Signed and Sealed this

Twenty-ninth Day of June, 2004

JON W. DUDAS
*Acting Director of the United States Patent and Trademark Office*